United States Patent [19]

Marling et al.

[11] 4,448,500

[45] May 15, 1984

[54] TELESCOPE GUIDER

[75] Inventors: John B. Marling, 2111 Research Dr., #5, Livermore, Calif. 94550; Thomas K. Heath, Canyon Country, Calif.

[73] Assignee: John Beaton Marling, Livermore, Calif.

[21] Appl. No.: 307,585

[22] Filed: Oct. 1, 1981

[51] Int. Cl.³ .................... G02B 23/04; G02B 23/16; G02B 27/10

[52] U.S. Cl. ............................... 350/574; 350/557; 350/247; 350/172

[58] Field of Search ............... 350/557, 537, 567, 568, 350/502–505, 566, 562, 576, 574, 171, 172, 286, 287, 247, 410

[56] References Cited

U.S. PATENT DOCUMENTS

| | | | |
|---|---|---|---|
| 991,652 | 5/1911 | Saegmuller | 350/557 |
| 2,628,529 | 2/1953 | Braymer | 350/505 |
| 2,948,189 | 8/1960 | Fischer | 350/502 |
| 3,614,449 | 10/1971 | Ward | 350/505 |
| 3,898,678 | 8/1975 | Walworth | 354/79 |
| 3,900,858 | 8/1975 | McCann et al. | 354/79 |
| 4,283,112 | 8/1981 | Venable | 350/557 |

FOREIGN PATENT DOCUMENTS 965106 5/1975 Fed. Rep. of Germany ..... 350/502

*Primary Examiner*—Jon W. Henry
*Attorney, Agent, or Firm*—Francis H. Lewis

[57] ABSTRACT

Apparatus is disclosed for guiding a telescope during long-exposure astronomical photography. A reflecting prism or mirror is inserted into the peripheral portion of the optical field in front of the camera. The reflected light is observed through an eyepiece with cross-hairs, allowing the observer to focus the eyepiece on a particular guide star in the image field and adjust the telescope during the exposure to track the apparent motion of the object. The reflecting element is over half the diameter of the optical field in length, providing substantial improvement in light collection. The reflecting element may be rotationally adjusted around the optic axis for guide star selection. Further, the eyepiece position may be adjusted in a direction perpendicular to the eyepiece axis and in the plane of the optic axis, to provide for radial selection of the guide star in the optical field. A filter compartment behind the reflecting element is further provided.

8 Claims, 5 Drawing Figures

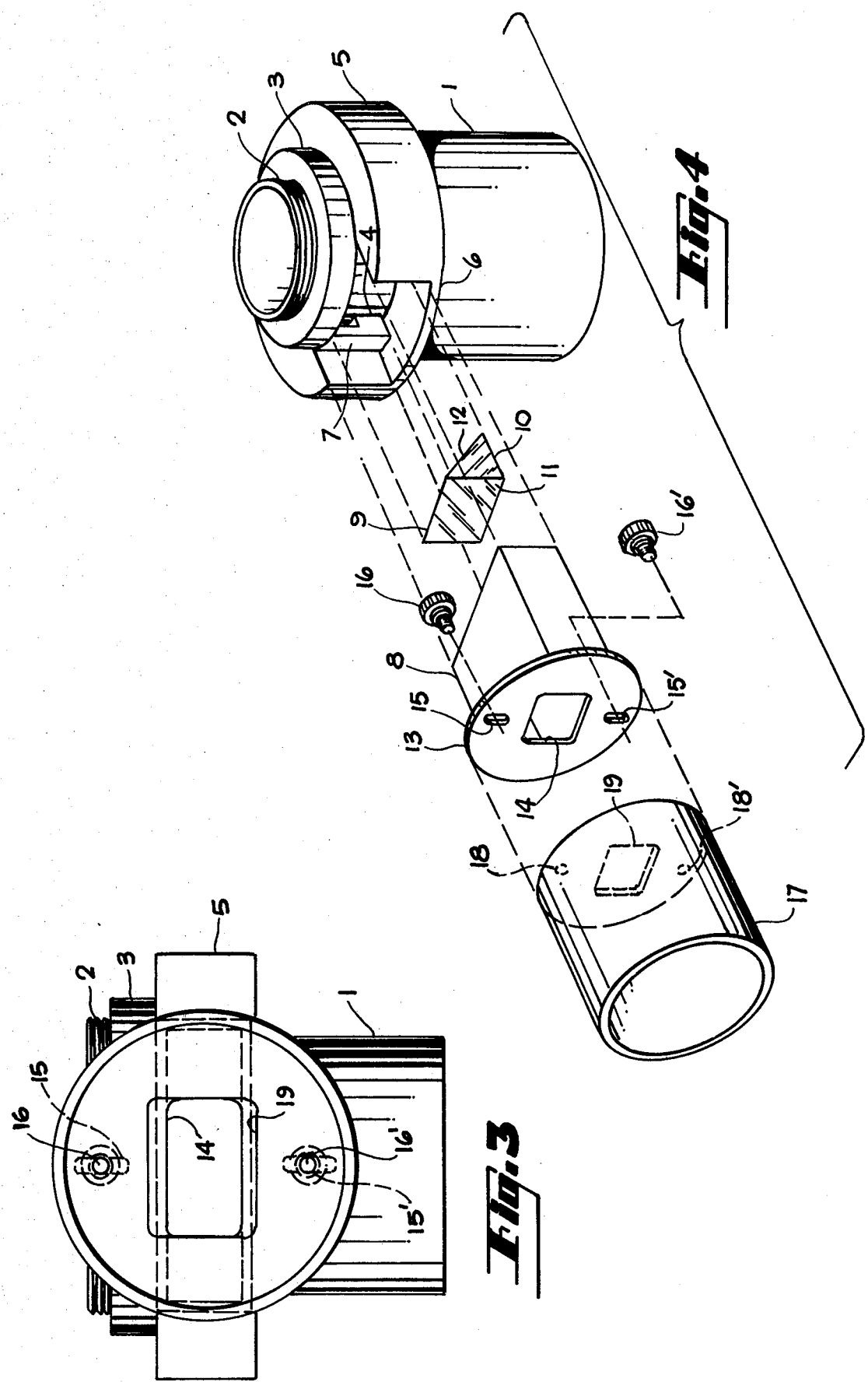

TELESCOPE GUIDER

BACKGROUND OF THE INVENTION

This invention relates to optical instruments. More particularly, the invention is directed to devices for controlling and adjusting telescopes in the photography of astronomical objects.

Astronomical photography ordinarily requires long exposure times because of the low intensity of the light received at the earth from very distant objects. During the exposure period it is necessary to adjust the telescope and camera constantly to maintain the track on the object, which appears to move across the sky because of the motion of the earth. Failure to maintain this adjustment causes the image of the object to become elongated, a phenomenon known as trailing. The apparent motion of astronomical objects is magnified by a telescope, and a photograph of a star or galaxy through a telescope will simply be a streak across the film unless the telescope is adjusted constantly during the exposure to hold the image steady by tracking this apparent motion.

A conventional method for accomplishing this tracking is to insert into the optical system a device having an ocular with cross-hairs, through which a portion of the image field may be viewed. Such a device is termed a guider. One selects a particular star in this part of the image field and adjusts the device to center the cross-hairs on the star, called a guide star. As the camera exposure proceeds, one constantly varies the position of the telescope to keep the cross-hairs centered on this guide star. In this manner the image field is held stationary relative to the camera.

It is desirable to provide a guider which will not degrade or distort the main optical image in the camera. This is achieved by sampling only a small portion of the optical field off the optical axis. However, if this portion is too small the guide stars in the field become limited to the brightest stars, and the photographic objects available are correspondingly restricted. For the same reason, it is desirable to provide a guider which features the maximum adjustability to allow the greatest possible range of choices for selecting a guide star.

Conventional guiders include devices which are installed in front of the camera and sample a portion of the optical field by means of a mirror or prism off the optical axis. The sampled light is directed into an ocular having cross-hairs. Adjustability is achieved by rotation of the entire device around the optical axis. Unfortunately, presently available off-axis guiders consume an additional 2-3 inches of focal length of the telescope. This is a severe limitation in Newtonian telescopes, since the focal length is limited by the size of the secondary mirror. In the smaller telescopes of this type there is not sufficient focal length available for such off-axis guiders; the focal plane must lie within a short distance from the surface of the main telescope tube. Installation of an off-axis guider of the conventional type requires cutting a hole in the main tube and modification of the optical system, an undertaking of considerable effort and expense.

A further limitation of these conventional guiders is that the guide star is required to lie in a narrow annular band around the perimeter of the image field. Thus, if the object is centered in this field, one cannot track the telescope on guide stars that are too close to the object in the image plane. One can direct the light from other stars into the eyepiece by tilting the mirror or prism, but then the focal plane will no longer be perpendicular to the axis. This is a problem in Cassegrainian and Newtonian telescopes, and results in image distortion. Radial selection of guide stars in the optical field can also be provided by moving the mirror further into or out of the field. However this adjustment results in loss of available light to either the camera or eyepiece, an undesirable effect in either case. In short, there is no guider presently available that provides for radial selection of guide stars in a satisfactory manner.

SUMMARY OF THE PRESENT INVENTION

The present invention discloses a guider for telescope photography of astronomical objects having improved features and characteristics. A short tubular section is mounted directly in front of the camera on the telescope, with the axis of the tube collinear with the camera-telescope optic axis. A long narrow rectangular prism or mirror projects a short distance into the optical field and is positioned to reflect rays from the periphery of the field parallel to the optic axis through a rectangular aperture in the wall of the tube in a direction perpendicular to the optic axis. Paraxial rays are reflected through a rectangular duct enclosing the aperture into an eyepiece with cross-hairs, having an ocular axis perpendicular to the optic axis. The eyepiece is mounted on the duct in a manner allowing translational adjustment of the eyepiece in a direction parallel to the optic axis. The tubular section is provided with a compartment for holding a filter or optical element between the reflector and the camera. The entire assembly is mounted on the telescope in a manner allowing rotational adjustment around the optic axis.

The longer side of the prism is perpendicular to the optic axis, and its length is over half the diameter of the optical field. This improvement in design produces greater light collection and results in brighter guide star images at the ocular. The shorter side of the prism is so small that the entire prismduct assembly occupies only ½ inch of distance along the optic axis, resulting in minimal reduction of available focal length. The ocular adjustment feature allows radial selection of guide stars in the optical field without blockage of the photographic beam, loss of light to the ocular, or distortion of the ocular image.

Accordingly, it is an object of the present invention to provide a guider for telescopic photography of astronomical objects with improved light collection efficiency and brighter guide star images.

A second object of this invention is to provide a guider occupying minimal space along the optic axis, for use in Newtonian telescopes with limited focus travel.

Another object of this invention is to provide a guider allowing radial as well as rotational selection of guide stars in the optical image field, without light loss or image distortion.

A further object of this invention is to provide a guider having a compartment for filters or optical elements in photographing objects without attenuation of or interference with the guide star image.

Yet a further object of this invention is to provide a guider which is simple, inexpensive, easy to install and convenient to use, without extensive modification of the camera or telescope.

Further objects, purposes, and advantages of the present invention will be readily apparent to persons skilled in the art relevant to this invention upon examination of the following detailed description of the preferred embodiment, together with the accompanying drawings.

BRIEF DESCRIPTION OF THE DRAWINGS

FIG. 3 is a side elevational view of the guider, looking toward the right of the apparatus as shown in FIG. 1.

FIG. 4 is a perspective exploded view of the guider, showing the individual components and their relationship.

DETAILED DESCRIPTION OF THE PREFERRED EMBODIMENT

Figure 1:
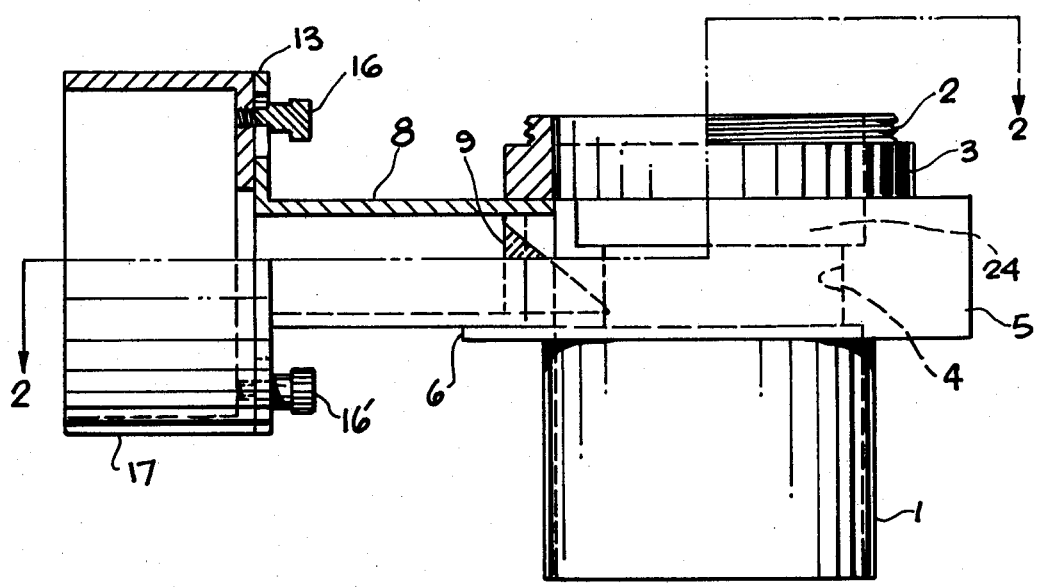
FIG. 1 is an elevational view of the guider apparatus, partially sectioned along 1—1 of FIG. 2 to show the internal construction.
Figure 2:
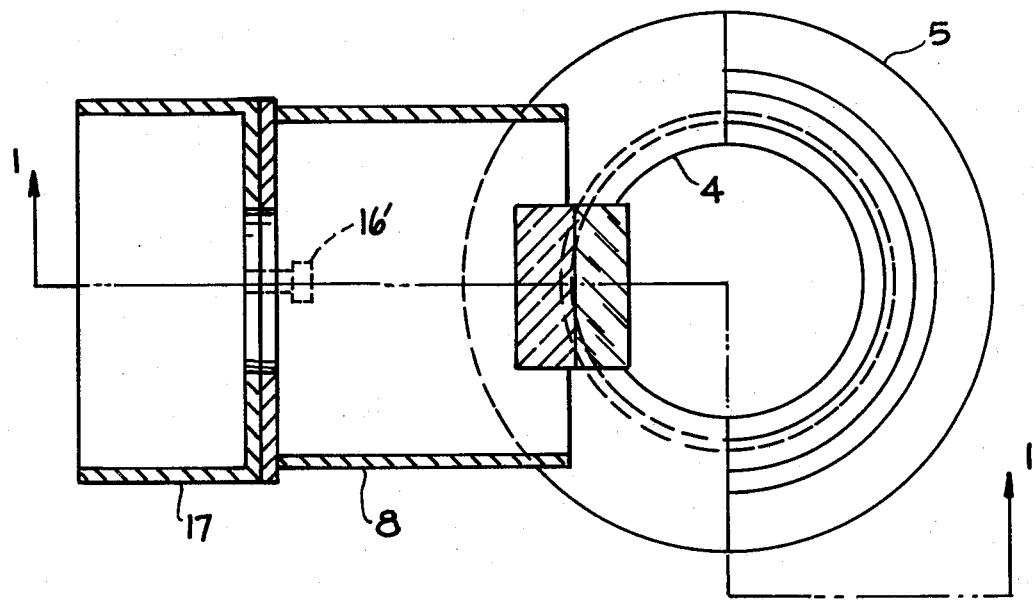
FIG. 2 is a plan view of the guider, partially sectioned along 2—2 of FIG. 1, showing the internal construction.
Figure 5:
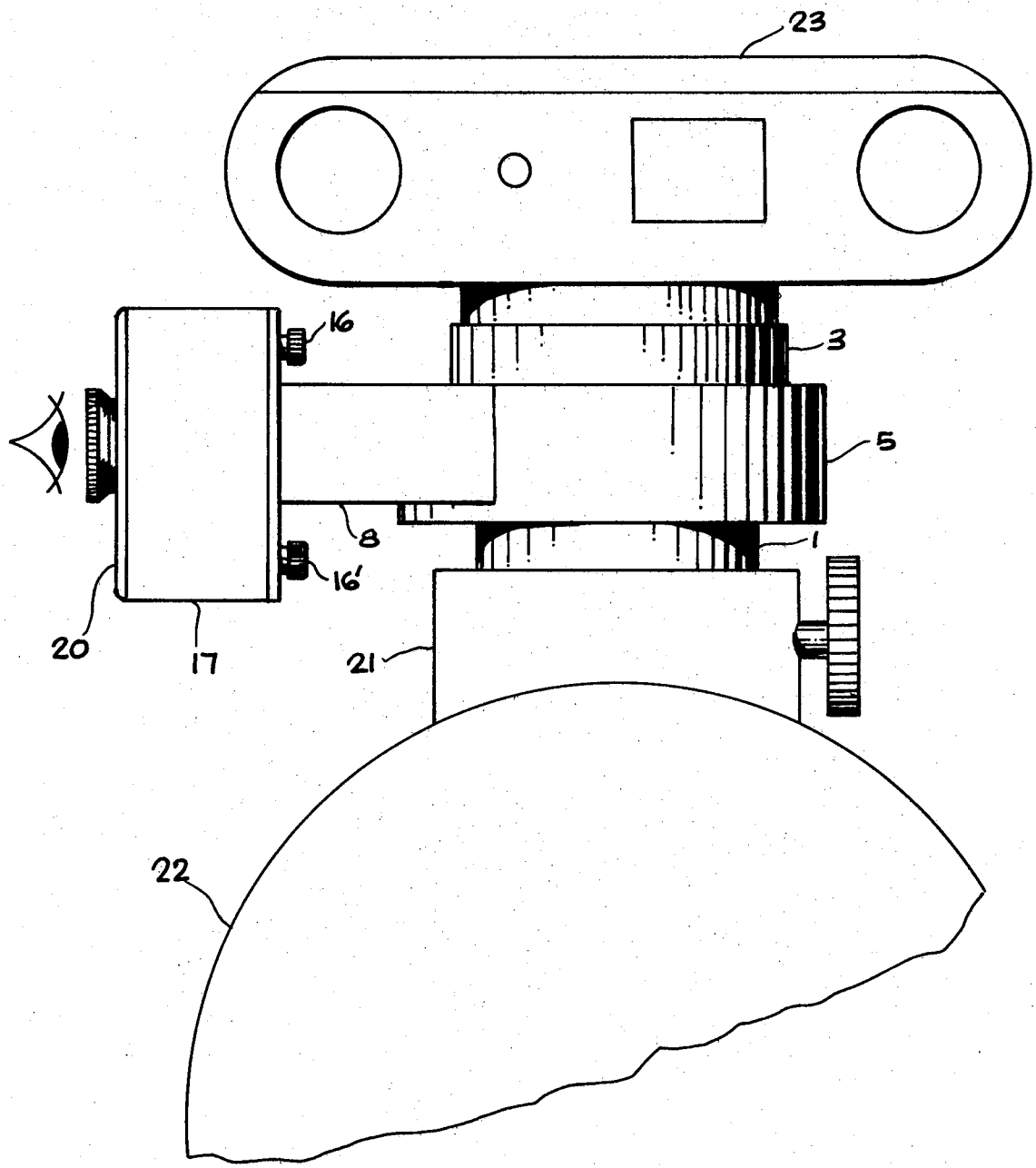
FIG. 5 is an elevational view of the guider in use, mounted on a Newtonian telescope with a camera attached, as viewed from the end of the main telescope tube.

Referring to the drawings, the main body of the guider is a tubular member, the lower portion 1 being adapted to fit into the focusing mount 21 of the telescope 22 as shown in FIG. 5. The upper end of the member is suitably threaded, 2, with a collar 3, such that the camera 23 may be mounted thereon. The inner surface of the member is cylindrical in shape, with a shoulder 4 near the upper end, projecting inward and forming a compartment 24 suitable for holding a filter or optical element directly in front of the camera body. Immediately below the collar 3, the exterior of the tubular member has a larger collar 5 extending downward to an elevation below the lower edge of the shoulder 4. A rectangular aperture extends through the wall of the tubular member in the region of the collar 5, the upper surface of the rectangle being coincident with the upper surface of this collar. The lower surface of the rectangular aperture lies slightly higher than, and parallel to, the lower surface of the collar, so that a ledge 6 is formed at the aperture. The lateral sides of the rectangle are thus parallel to the optic axis. The rectangular aperture extends partially through the member wall, and a smaller rectangular hole extends into the interior of the tubular member, forming a recession 7. The width of both rectangles is substantially larger than the height, and exceeds half the diameter of the interior of the tube. The entire member can be rotated in the focusing mount about the optic axis.

A rectangular duct 8 is provided, having an exterior surface coincident with the larger rectangle and fitting into the larger aperture, the end of the duct lying against the recession 7. A reflecting prism 9 is mounted at the end of the duct and fits into the smaller rectangular aperture when the duct is in place. The prism thus extends into the interior of the tubular member at a level below the upper edge of the shoulder 4. The lower face 10 of the prism lies in a plane perpendicular to the optic axis; light from the telescope enters this face. The optical exit face 11 lies perpendicular to the duct walls and parallel to the optic axis. The perimeter of this face is the same size and shape as the smaller rectangular aperture. The reflecting face 12 is inclined at an angle of 45 degrees relative to the optic axis, and the upper and lower rectangular sides of the duct. The prism therefore reflects paraxial rays of light from the telescope into the duct along its central axis.

A plate 13 is attached to the opposite end of the duct, perpendicular to the duct axis. The plate has a rectangular hole 14 centered on the duct axis, of the same size and shape as the optical exit face 11 of the prism. The duct walls surround this hole, and the duct thus forms an optical channel between the prism 9 and the hole 14. Mounting holes 15, 15' are drilled through the plate above and below the intersection between the duct walls and the plate, i.e. outside the duct. These holes are elongated in the vertical direction and accommodate mounting thumbscrews 16, 16' inserted from the side of the plate to which the duct is attached. The vertical elongation of the holes allows the thumbscrews to slide up or down, but the holes allow no lateral movement of these thumbscrews.

The eyepiece holder comprises a cylinder 17 which is open at one end, with a wall at the opposite end which rests flush against the face of the plate 13 on the side opposite to the joinder with the duct 8. The thumbscrews extend through the plate into threaded holes 18, 18' located in the wall of the holder, and the holder is thereby mounted fast to the duct plate by tightening these thumbscrews. The holes 18, 18' are the same distance apart as the separation between the centers of the elongated holes 15, 15'.

It will be evident that this structure allows the position of the eyepiece holder to be adjusted vertically by loosening the thumbscrews and sliding them up or down in the elongated mounting holes. A third hole 19, rectangular in shape, penetrates the central region of the end wall. The width of this hole is the same as that of the duct plate aperture 14, and the hole is laterally centered on the aperture 14. The vertical size of the hole 19 exceeds that of the aperture 14 by an amount sufficient that no portion of the duct plate aperture 14 is obstructed by the end wall of the eyepiece holder when this holder is at its extreme upward or downward position. Therefore all of the light passing through the duct plate aperture emerges into the interior of the eyepiece holder.

The open end of the eyepiece holder is suitable for the insertion of an eyepiece 20, so that the viewer may look through the eyepiece down the axis of the rectangular duct 8 toward the reflecting prism. The eyepiece is provided with fiduciary cross-hairs in the conventional manner, so that the eyepiece may be centered on a particular guide star image. The length of the duct and eyepiece holder are such that the eyepiece may be adjusted in the conventional manner so that its focal point lies on the focal plane of the light rays reflected by the prism. The viewer is therefore able to observe the image of the optical field.

It is apparent from the above description that the portion of the optical field seen through the eyepiece may be adjusted by rotating the entire apparatus in the focusing mount around the optic axis. The viewer may thereby select for viewing a portion of an annular band of the optical image. Radial adjustment of this band is further achieved by adjusting the vertical position of the eyepiece holder by means of the thumbscrews. In this manner a very large fraction of the telescope image is available for viewing and guide star selection.

It will be further appreciated that the invention described here is simple and convenient to use on virtually any telescope. No special modification of the telescope or camera is needed for installation. The reduction in available focal length caused by the apparatus is limited by the vertical extent of the reflecting prism 9, and may be as little as ½ inch. The length of the prism enhances the light collection ability of the guider and the image brightness at the viewer, and further increases the number of stars available for guide selection.

The foregoing detailed description refers to a particular embodiment of the present invention. However, it will be appreciated that various modifications and alterations may be made within the spirit and scope of this invention.

What is claimed is:

1. Guiding apparatus for a telescope having an optical field of substantially circular cross section and a camera focused along the optic axis, comprising:

means for bending rays of light from a peripheral portion of the optical field of the telescope into a direction away from the optic axis, said means being attached to said telescope in front of the camera and intercepting the light from said portion of the optical field, wherein said portion substantially occupies the region outside a chord across said field whose length is less than the diameter of said optical field, but is not substantially less than one-half the diameter of the field; and means for observing the image of the field portion intercepted by said bending means;

wherein said observing means comprises a support holding an eyepiece through which said image is observed, wherein said support is adjustably attached to said bending means in a manner such that the position of said eyepiece may be varied along a direction perpendicular to the eyepiece axis and lying in the plane of the eyepiece axis and optic axis, and wherein said support comprises:

a plate attached to said bending means, having a plurality of holes;

an eyepiece holder having a plane surface slidably contiguous to said plate, said surface having a plurality of holes aligned with said plate holes, wherein at least one of each pair of aligned holes is elongated in said direction of eyepiece adjustment; and a plurality of screw fastener members, each member fitting into one pair of said aligned holes, such that said holder may be thereby adjusted and fastened against said plate.

2. Apparatus as recited in claim 1, wherein said direction is perpendicular to the optic axis.

3. Apparatus as recited in claim 1, wherein said bending means comprise:

a reflecting prism of length not substantially less than one-half the diameter of the optical field; and support means for holding said prism in position to intercept said portion of the optical field.

4. Apparatus as recited in claim 1, wherein said bending means comprise:

a mirror of length not substantially less than one-half the diameter of the optical field; and support means for holding said mirror in position to intercept said portion of the optical field.

5. Apparatus as recited in claim 1, wherein said bending means occupies a distance parallel to the optic axis not in excess of one-half inch.

6. Apparatus as recited in claim 1, wherein said support means may be rotated around the optic axis.

7. Apparatus as recited in claim 1, wherein said support means further comprises means for supporting an optical element downstream from said bending means.

8. Apparatus as recited in claim 1, wherein said support means comprises a tubular member concentric with the optic axis of the telescope, having an aperture in the wall supporting said prism or mirror and allowing reflected light to emerge from said tubular member.

* * * * *